July 26, 1966    J. V. ATTERBURY    3,262,728
HANDLING DEVICE FOR FOOD PANS
Filed April 10, 1964
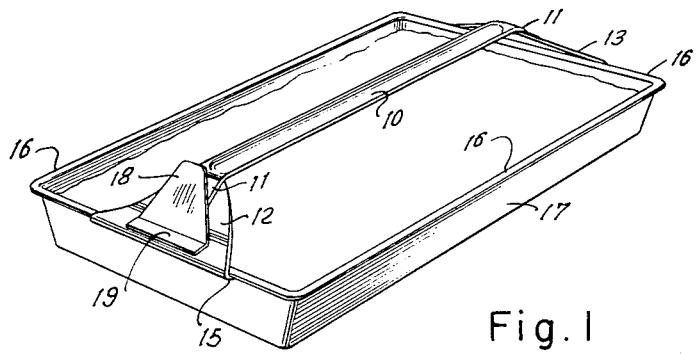
Fig. 1
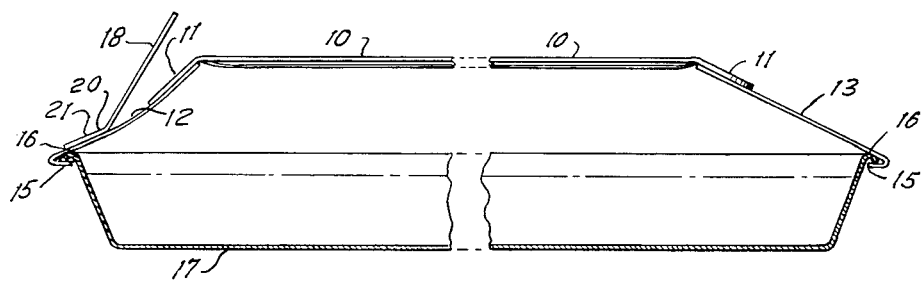
Fig. 2
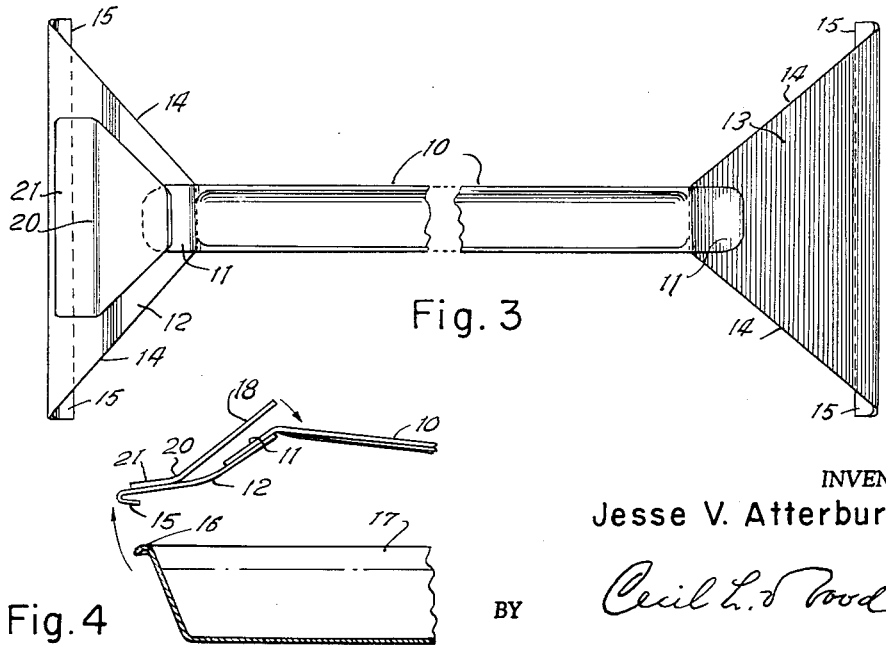
Fig. 3
Fig. 4
INVENTOR
Jesse V. Atterbury
BY
ATTORNEY

United States Patent Office 3,262,728
Patented July 26, 1966

3,262,728
HANDLING DEVICE FOR FOOD PANS
Jesse V. Atterbury, 3628 Northhaven Road, Dallas, Tex.
Filed Apr. 10, 1964, Ser. No. 358,686
2 Claims. (Cl. 294—16)

This invention relates to handling devices, and it has particular reference to lifters and handlers for hot food utensils, such as the pans and trays used in cafeterias, and other food dispensaries, and supported in the wells of steam tables.

In the handling of the relatively large pans or trays containing hot foods, in their transference from the kitchen to the steam tables, it is necessary that the receptacle be lifted and carried with special care to prevent spillage of the contents, and above all, avoid scalding or burning the handler. It is common practice to manipulate these containers with padded gloves or mittens specially designed for this purpose, or with insulated pads.

Since practically all of the pans and trays now generally in use on steam tables are relatively shallow, having flanged upper rims which rest snugly against the tops of wells in the tables, it is not an easy task to penetrate beneath the flanges of the containers when removing them from the wells in which they are seated and obtain a firm grasp thereon whereby they may be safely transferred back to the kitchen due to the fact that, although the containers may be empty, the heat from the steam table presents a hazard. This is especially true during rush periods at mealtimes.

An important object of the invention resides in the provision of a tool by which utensils of the character described can be conveniently and safely picked up from the steam table, or other supporting surface, such as a stove, and carried to another location while the vessel is too hot to handle safely with the bare hands.

It is an object of the invention to provide a detachable handle having means embodied therein for overreaching and firmly engaging the flanged edges of the relatively flat food containers whereby they can be safely and easily carried, with their contents, deposited in thier supporting wells on a steam table, and released with a minimum of effort.

A further object of the invention is that of providing a releasable handle for food pans which is simple and economical in design and structure, and sufficiently flexible to be readily applied to the vessel and released therefrom so that greater efficiency and safety in handling can be maintained.

Broadly, the invention contemplates the provision of a tool by which hot food pans may be easily and safely handled with greater efficiency and rapidity by unskilled personnel.

While the foregoing objects are paramount, other and lesser objects will become apparent as the description proceeds, when considered in connection with the appended drawings wherein:

FIGURE 1 is a perspective illustration of a typical steam table pan to which the invention is applied.

FIGURE 2 is a longitudinal sectional view of a typical pan, showing the invention applied thereto, the engaging members being shown embracing the end flanges of the pan.

FIGURE 3 is a plan view of the invention, shown broken away at midsection, illustrating the substantially triangular pan engaging members and the releasing plate on one of the latter.

FIGURE 4 is a fragmentary cross-sectional illustration of one end of a pan, and fragmentarily showing the invention as applied to or removed from the pan.

In its preferred form, shown in FIGURES 1 to 4, inclusive, the invention comprises a handle 10 which consists of a strip of metal whose ends 11 are inclined downwardly, as the device is used, and spot-welded, or otherwise secured to triangular engaging members 12 and 13 formed of sheet metal and having their planar surfaces in planes parallel to the ends 11 of the handle 10 and whose opposing side edges 14 flare outwardly toward the engaging edges 15 which are turned downwardly and inwardly whereby to engage and overreach the flange 16 of a utensil or pan 17, in the manner shown in FIGURES 1 and 2.

The engaging members 12 are capable of some flexibility in the application of the invention to a pan 17, or in releasing the same therefrom, and to expedite this operation a substantially rigid plate 18, which may be generally triangular in peripheral outline, is attached along its longer edge 19 to one of the engaging members 12 or 13 by spot-welding, or other means, as shown in FIGURES 1, 2, 3 and 4.

Spaced from and parallel to the straight longer edge 19 of the plate 18 is a transverse bend 20 by which is formed a tab portion 21 which is elongated and rectangular in outline and its planar surfaces are obtusely angled with respect to the free extended triangular body of the plate 18 which projects upwardly at an obtuse angle over the engaging member 12 to which it is attached, as shown best in FIGURE 2, and is inclined toward the end 11 of the handle 10. By pressing inwardly on the plate 18, as indicated by the arrows in FIGURE 4, the engaging member 12 can be flexed to engage or disengage the flange 16 of a pan 17. The handle 10 may be arcuate in transverse section for suitable rigidity.

The invention is capable of certain changes in structure and design, by persons skilled in the art, without departing from the spirit and intent thereof or the scope of the appended claims.

What is claimed is:
1. A handling device for food pans having a peripheral flange, comprising, an elongated rigid handle element having an obtuse angularly inclined portion at each end, a substantially triangular resilient pan engaging member integrally secured to each inclined end portion of said handle element, each having an inwardly directed flange formed along its longer lower edge engageable with the peripheral flange of a pan on opposite sides thereof, and a rigid plate integrally attached along one of its edges to one of said engaging members and extending outwardly and upwardly therefrom for flexing the same to release said pan.

2. In a handling device for food pans, as described in claim 1, wherein said rigid plate is substantially triangular and is secured along its longer edge to said member to extend upwardly at an obtuse angle therefrom toward said handle element.

References Cited by the Examiner
UNITED STATES PATENTS

| | | | |
|---|---|---|---|
| 2,198,244 | 4/1940 | Chapman | 294—33 X |
| 2,369,902 | 2/1945 | Krueger | 294—28 |
| 2,541,511 | 2/1951 | Guzel | 294—33 |
| 2,612,401 | 9/1952 | Simmonds | 294—33 |
| 2,717,171 | 9/1955 | Gottstein | 294—33 |

GERALD M. FORLENZA, Primary Examiner.
G. F. ABRAHAM, Assistant Examiner.